United States Patent [19]
Schneidmiller

[11] Patent Number: 5,557,880
[45] Date of Patent: Sep. 24, 1996

[54] YELLOW JACKET TRAP

[75] Inventor: Rodney G. Schneidmiller, Veradale, Wash.

[73] Assignee: Sterling International, Inc., Veradale, Wash.

[21] Appl. No.: 394,842

[22] Filed: Feb. 27, 1995

[51] Int. Cl.⁶ ..................................................... A01M 1/02
[52] U.S. Cl. ................................... 43/122; 43/121; 43/107
[58] Field of Search ................................ 43/122, 121, 107

[56] References Cited

U.S. PATENT DOCUMENTS 4,551,941  11/1985  Schneidmiller ............................ 43/107
5,231,791   8/1993  Falkson ..................................... 43/122

OTHER PUBLICATIONS

Marketing insert for "Sterling Rescue! Yellowjacket Control Trap", published in 1993.

Primary Examiner—Joseph J. Hail, III
Assistant Examiner—I.-H. Lin
Attorney, Agent, or Firm—Lee & Hayes, PLLC

[57] ABSTRACT

A yellow jacket trap has a cylindrical upper member detachably connected to a lower member. The upper member defines a hollow entrapment chamber having a bottom open end and a top end. The trap further includes an inverted cone removably inserted within the cylindrical upper member. The inverted cone has a first open end coincident with the bottom open end of the upper member and extends into the entrapment chamber. The cone tapers from its first open end to a second open end having a diameter less than that of the first open end. An orientation coupling is provided to align the inverted cone relative to the upper member and to guide the inverted cone during insertion into the upper member and removal therefrom. The trap also includes a detent element to releasably hold the inverted cone within the upper member. The detent element retains the inverted cone within the upper member even after the lower member is detached from the upper member during emptying of the entrapment chamber. This prevents the inverted cone from falling out of the upper member during emptying, thereby avoiding undesired spilling of dead yellow jackets onto the floor. The detent element enables the user to conscientiously remove the inverted cone during emptying by applying a little force to overcome the detent restraint.

15 Claims, 5 Drawing Sheets

YELLOW JACKET TRAP

TECHNICAL FIELD

This invention relates to insect traps for wasps, and namely, yellow jackets hornets.

BACKGROUND OF THE INVENTION

This invention is an improvement of an insect trap described and claimed in U.S. Pat. No. 4,551,941 which issued Nov. 12, 1985 and was also invented by Rodney Schneidmiller. This earlier patent describes a transparent cylindrical insect trap that is selective to entrapping wasps. A "wasp" is a generic name applied to insects of the order Hyminopteran which includes particularly hornets and yellow jackets. Throughout this disclosure, the more common insect description of "yellow jacket" will be primarily used in the discussion of the trap. It should be understood, however, that the trap is effective for other varieties of the insect Order.

The previous patented trap structure has a cylindrical top element and a bottom element that are threadably connected to form a cylindrical entrapment chamber. The bottom element has multiple orifices to permit insect entry. A circular truncated entry cone is provided inwardly of the entrance orifices and between the orifices and the internal entrapment chamber. Yellow jackets enter through the bottom orifices, fly into the conical element, pass through its truncated end, and become entrapped in the cylindrical chamber. Once inside the chamber, exiting is virtually impossible, thereby leading to the demise of the trapped insects. Portions of the trap are colored and a volatile olfactory attractant is provided in the bottom element to aid in attracting the yellow jackets.

For further background information, the reader is encouraged to review U.S. Pat. No. 4,551,941, which is hereby incorporated by reference.

Although the patented trap has proven effective at entrapping yellow jackets, the trap of this invention improves certain features of the previous version. In the previous version, the conical element simply rests within the top element and is held therein when the bottom element is screwed onto the top element. The trap is designed to be reusable, allowing a user to disassemble the trap to empty the dead yellow jackets from the entrapment chamber and then reassemble the trap for continued insect control. When disassembling a trap filled with deceased insects, the user unscrews the bottom element from the top element, removes the cone section (preferably above a waste container), and dumps the dead yellow jackets into the waste container.

Due to the structural configuration, however, the cone element is free to fall from it inserted position in the top element as soon as the bottom element is detached (assuming that the trap is held with the open side of the top section facing downward) unless the user alertly and quickly holds the cone element. If an unsuspecting user fails to temporarily restrain the cone element, all of the dead yellow jackets might fall onto the floor during emptying, resulting in a mess. It is therefore an aspect of this invention to provide an improved trap that does not undesirably expel dead yellow jackets during emptying.

Another feature of the previous trap that this invention seeks to improve is the ease of handling during assembly and disassembly. Such aspects of this invention are helpful for individuals with limited tactile movement, such as elderly or persons with arthritis or other motion debilitating conditions.

This invention also seeks to improve controllability of the air flow through the trap. Air flow circulates the olfactory attractants used in the trap to entice yellow jackets therein. Improved control of the air flow can enhance circulation of the attractants.

SUMMARY OF THE INVENTION

This invention provides an improved yellow jacket trap that facilitates handling ease during disassembly, emptying, and reassembly. The yellow jacket trap includes a cylindrical upper member detachably connected to a lower member. The upper member defines a hollow entrapment chamber having a bottom open end and a top end. The trap further includes an inverted cone removably inserted within the cylindrical upper member. The inverted cone has a first open end coincident with the bottom open end of the upper member and extends into the entrapment chamber. The cone tapers from its first open end to a second open end having a diameter less than that of the first open end. An orientation coupling is provided to align the inverted cone relative to the upper member and to guide the inverted cone during insertion into the upper member and removal therefrom.

In the preferred embodiment, the orientation coupling includes a pair of slots formed in the upper member and a pair of guide pegs that project from the inverted cone. The pegs matingly slide within corresponding slots to orient and guide the inverted cone relative to the upper member. A pair of prongs are also provided to project outward from the inverted cone bottom to further aid a user when grasping the inverted cone during insertion into or removal from the upper member. The orientation coupling and prongs provide improved ease of handling during assembly and disassembly.

The trap also includes a detent element to releasably hold the inverted cone within the upper member. Preferably, the detent element is a pair of raised bumps formed in each slot to engage the guide pegs during insertion of the inverted cone into the upper member. The detent element retains the inverted cone within the upper member even after the lower member is detached from the upper member during emptying of the entrapment chamber. In this manner, the inverted cone is prevented from falling out of the upper member during emptying, thereby avoiding undesired spilling of dead yellow jackets onto the floor. The detent element enables the user to conscientiously remove the inverted cone during emptying by applying a little force to overcome the detent restraint.

BRIEF DESCRIPTION OF THE DRAWINGS

FIG. 1 also shows the yellow jacket trap in a closed or minimum air flow setting.

DETAILED DESCRIPTION OF THE PREFERRED EMBODIMENT

U.S. Pat. No. 4,551,941, which issued Nov. 12, 1985 and names the same inventor Rodney Schneidmiller as the present invention, is hereby incorporated by reference.

Figure 1:
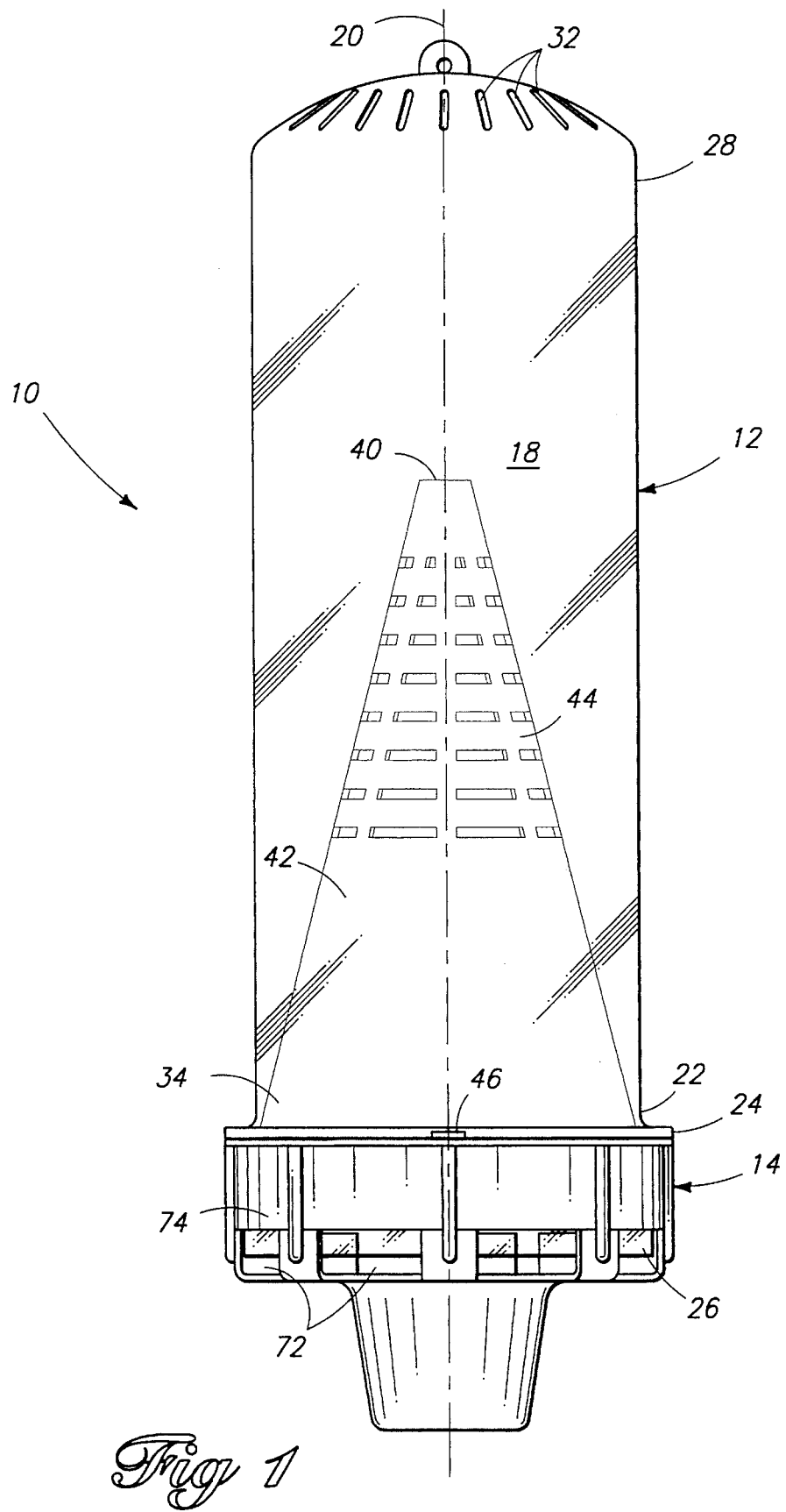
FIG. 1 is a front side view of a yellow jacket trap according to this invention.
Figure 2:
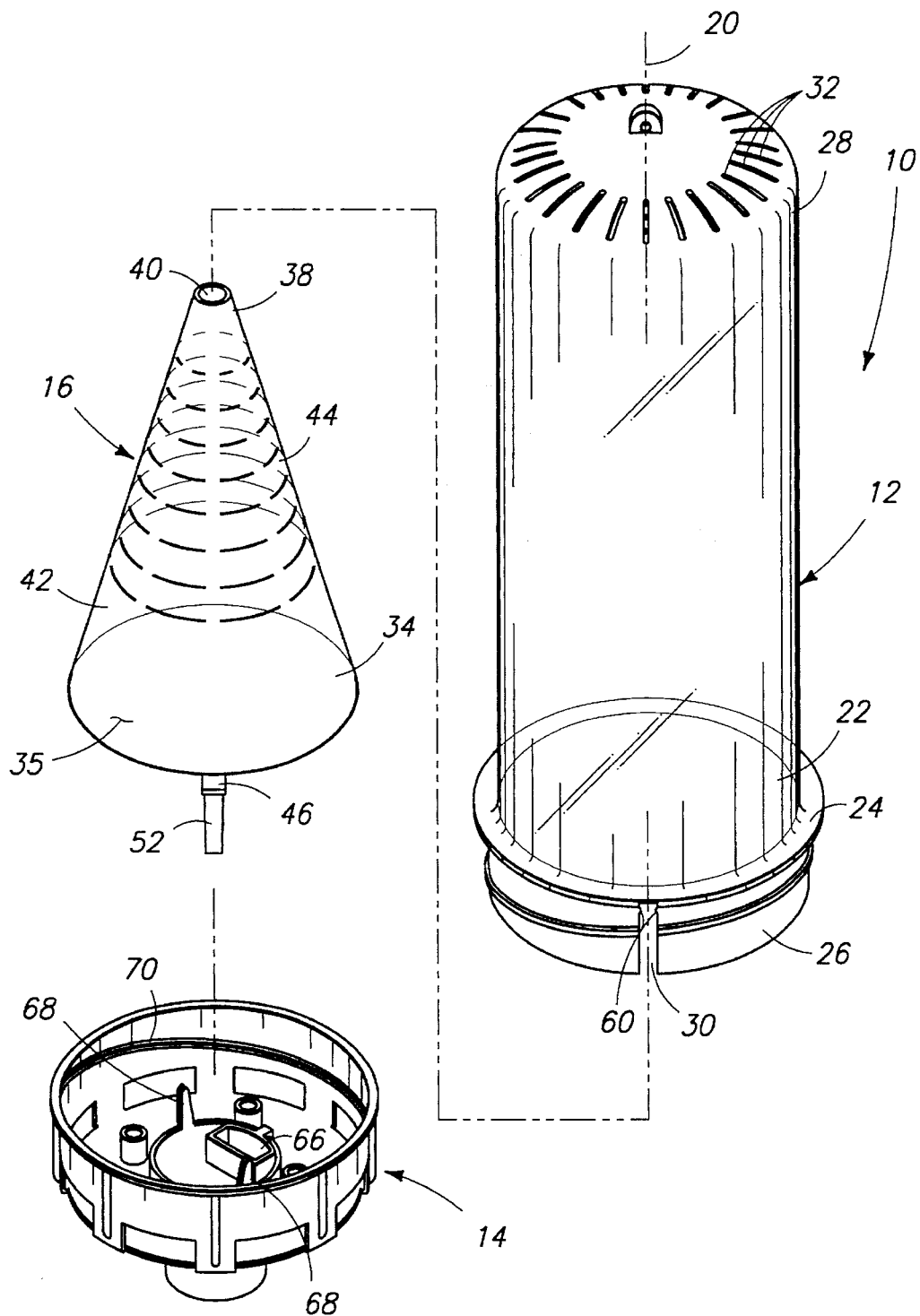
FIG. 2 is a reduced, exploded, perspective view of the FIG. 1 yellow jacket trap.

FIGS. 1 and 2 show a yellow jacket trap 10 according to this invention. Trap 10 has a transparent first or upper member 12 and an opaque second or lower member 14 which is detachably connected to the upper member. Preferably, the lower member 14 is threadably coupled to upper member 12. Yellow jacket trap 10 also has a transparent, inner, inverted cone 16 intermediate of the upper and lower members. When threadably attached, lower member 14 securely fastens the inverted cone within upper member 12.

Upper member 12 defines a hollow entrapment chamber 18 for trapping live yellow jackets, and later containing the deceased carcasses. Upper member 12 comprises a hollow cylinder aligned along a central longitudinal axis 20. Upper member 12 is preferably formed of a transparent, greenish tinted plastic which acts as an optical attractant for yellow jackets. Upper member 12 has a bottom open end 22 with a radially projecting shoulder or shelf 24 and a threaded skirt 26 (FIG. 2), and a top closed end 28. The upper member also has a pair of diametrically opposed slots 30 formed in bottom open end 22. Slots 30 are arranged longitudinally in the sidewalls of upper member 12 in a substantial parallel alignment relative to longitudinal axis 20.

Figure 3:
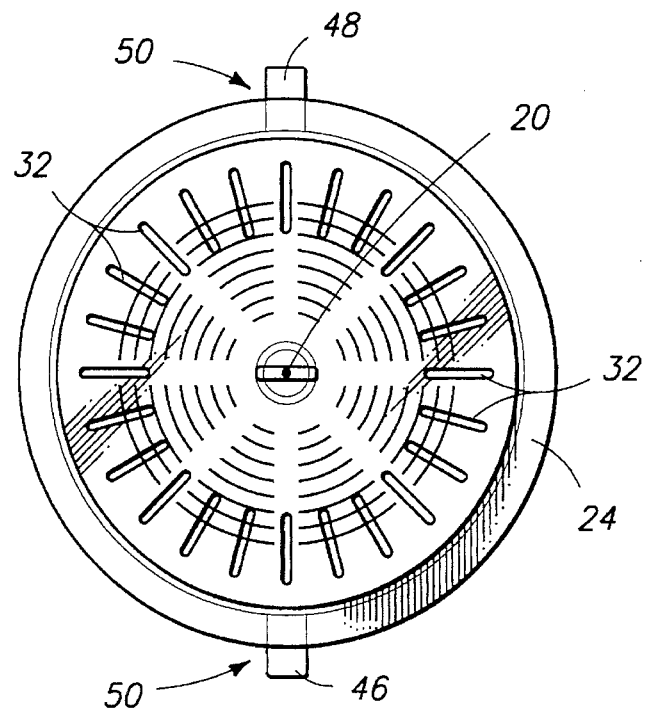
FIG. 3 is a top view of the yellow jacket trap, and namely, of an upper member of the trap.

As additionally shown in FIG. 3, multiple elongated vent 32 are formed in top end 28 of upper member 12. Vents 32 extend radially outward from central axis 20 and are so formed to help facilitate air flow circulation through entrapment chamber 18, as is discussed below in more detail.

Inverted cone 16 is coaxially aligned with upper member 12 along central axis 20. Cone 16 tapers from a first, bottom open end 34 having a large diameter opening 35 to a second, top open end 38 having a small diameter opening 40. The size of large opening 35 is slightly less than the diameter of the bottom open end 22 of upper member 12 whereas the size of opening 40 is sufficient to permit passage of a yellow jacket, but not much larger. The cone can be inserted into or removed from the cylindrical-shaped upper member. When inserted, inverted cone 16 lies in an orientation that positions its truncated narrow end 38 within entrapment chamber 18 and its larger open end 34 coincident with bottom open end 22 of upper member 12.

Inverted cone 16 has a lower solid base portion 42 and an upper screen or mesh portion 44. This upper screen portion has plural spaced orifices that are small enough to prevent the passage of a yellow jacket, but large enough to pass light therethrough and to aid the yellow jacket in crawling upwardly toward narrow opening 40.

Inverted cone 16 also has a pair of diametrically opposed guide pegs 46 and 48 which project radially outward (relative to central axis 20) from bottom end 34. Guide pegs 46 and 48 are sized to matingly slide within corresponding slots 30 formed in upper member 12. Guide pegs 46 and 48 form a preferred embodiment of an orientation coupling 50 which aligns inverted cone 16 relative to upper member 12 and additionally guides the inverted cone during insertion into upper member and removal therefrom. The orientation coupling can be configured differently in other embodiments. In general, its preferred construction includes a first coupling element formed as part of the upper member and a second coupling element formed as part of the inverted cone, whereby the first and second coupling elements matingly engage to orient and guide the inverted cone relative to the upper member. Such alternative configurations of an orientation coupling might include a knob and groove arrangement, or corresponding self-aligning shapes of lower cone end 34 and lower cylindrical member end 22.

A pair of diametrically opposed prongs 52 (of which only one is shown in FIG. 2) is provided on cone 16 to aid a user when grasping the inverted cone for insertion into or removal from upper member 12. Prongs 52 project from bottom end 34 of cone 16 in a substantially parallel direction with respect to central longitudinal axis 20. The prongs are sized to lie within corresponding slots 30 of upper member 12 when the inverted cone is inserted therein.

The orientation coupling and prongs provide improved ease of handling during assembly and disassembly. The orientation coupling ensures proper orientation of the cone within the upper member. The prongs are helpful for individuals with limited tactile movement, such as elderly or persons with arthritis or other motion debilitating conditions, because the prongs can be conveniently grasped during assembly.

Yellow jacket trap 10 further includes a detent element to releasably hold the inverted cone 16 within upper member 12 when lower member 14 is removed. In the preferred implementation, the detent element comprises at least one raised bump that engages a portion of the inverted cone when the cone is inserted into or removed from the upper member. In the illustrated embodiment, a pair of raised bumps 60 (FIG. 2) are formed in each associated slot 30 of upper member 12. The raised bumps are effective to hold the inverted cone within the upper member when guide pegs 46 and 48 are slid passed the bumps during insertion of the cone into the upper member. During removal, the retention force of the detent element can be overcome by a user applying a sufficient urging force.

The detent elements prevent the inverted cone from falling out of the upper member during disassembly when the user is emptying the trap. This feature thereby prevents undesired spilling of dead yellow jackets onto the floor. The detent elements enable the user to conscientiously remove the inverted cone during emptying by applying a sufficient force to overcome the detent restraint, while holding the trap above a waste container.

It is noted that other constructions of a detent element can be used in this invention. For instance, the detent element might comprise a ratchet arrangement where the cone guide peg is pushed passed several toothed edges formed in the upper member. An alternative configuration might include a twist-lock arrangement where right angled, "T"-shaped slots are formed in the upper member to permit the cone guide pegs to rotate into a locked position upon twisting the inverted cone relative to the upper member.

Figure 4:
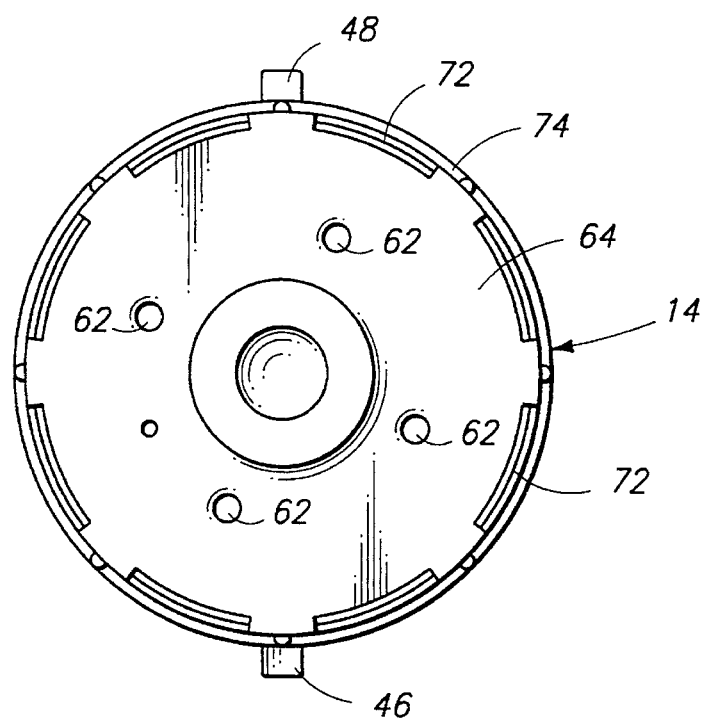
FIG. 4 is a bottom view of the yellow jacket trap, and namely, of a bottom member of the trap.
Figure 5:
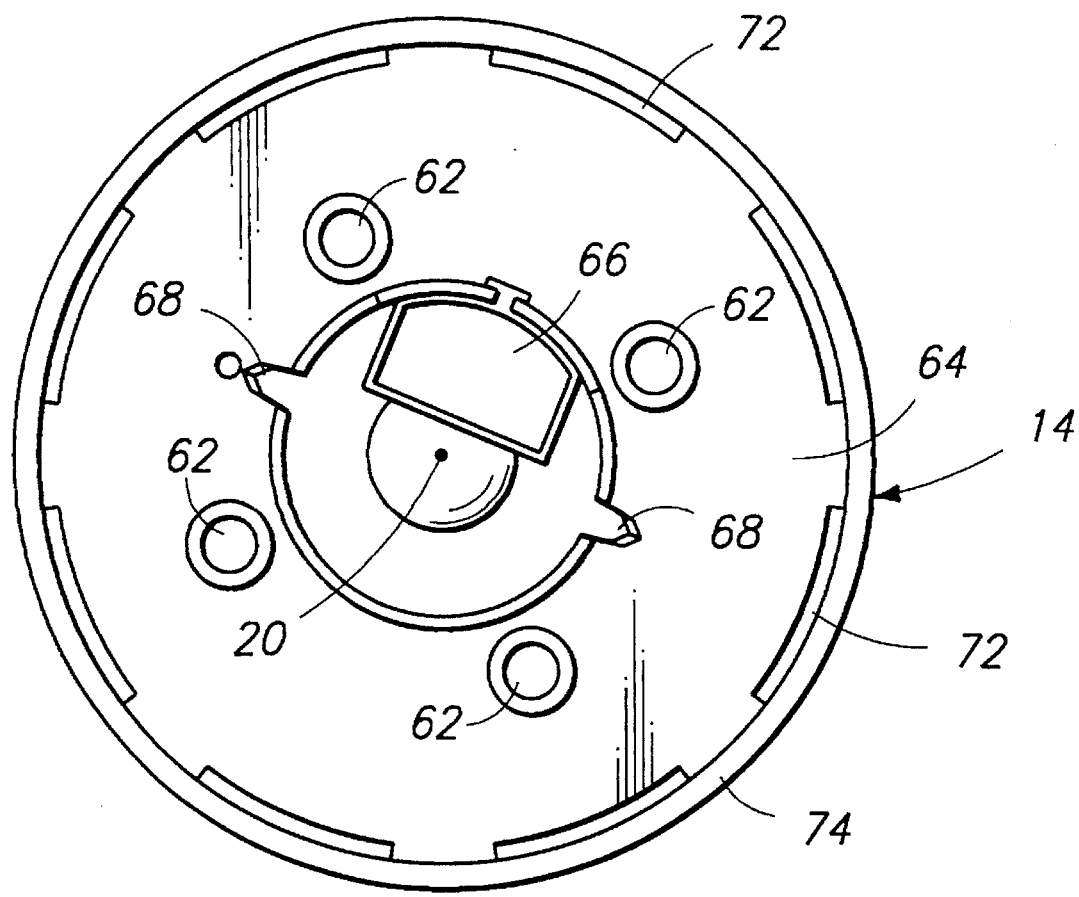
FIG. 5 is a top view of the FIG. 4 bottom member.

FIGS. 4 and 5 show lower member 14 in more detail. Lower member 14 has multiple entry orifices 62 formed in floor 64 and evenly spaced about central axis 20. The entry orifices are sized to permit passage of a yellow jacket into the trap. An attractant tray 66 is formed on the inside of lower member 14 to hold an appropriate volatile olfactory attractant specific for yellow jackets. Suitable attractants include butyl benzoate, pentyl pentanoate, and dimethyl benzyl carbinyl acetate. Preferably, a cotton wadding is doused with a suitable attractant and placed in tray 66. A pair of meat spikes 68 are also provided to hold a suitable food favorable to yellow jackets. The food additionally helps attract and retain the yellow jackets during operation of the trap.

With reference again to FIGS. 1 and 2, lower member 14 has a threaded inner surface 70 that mates with threaded skirt 26 of upper member 12 to form a detachable coupling. Lower member 14 also has multiple air flow windows 72 formed in sidewalls 74. The combination of air flow windows 72 and vents 32 enable air circulation through entrapment chamber 18.

Figure 6:
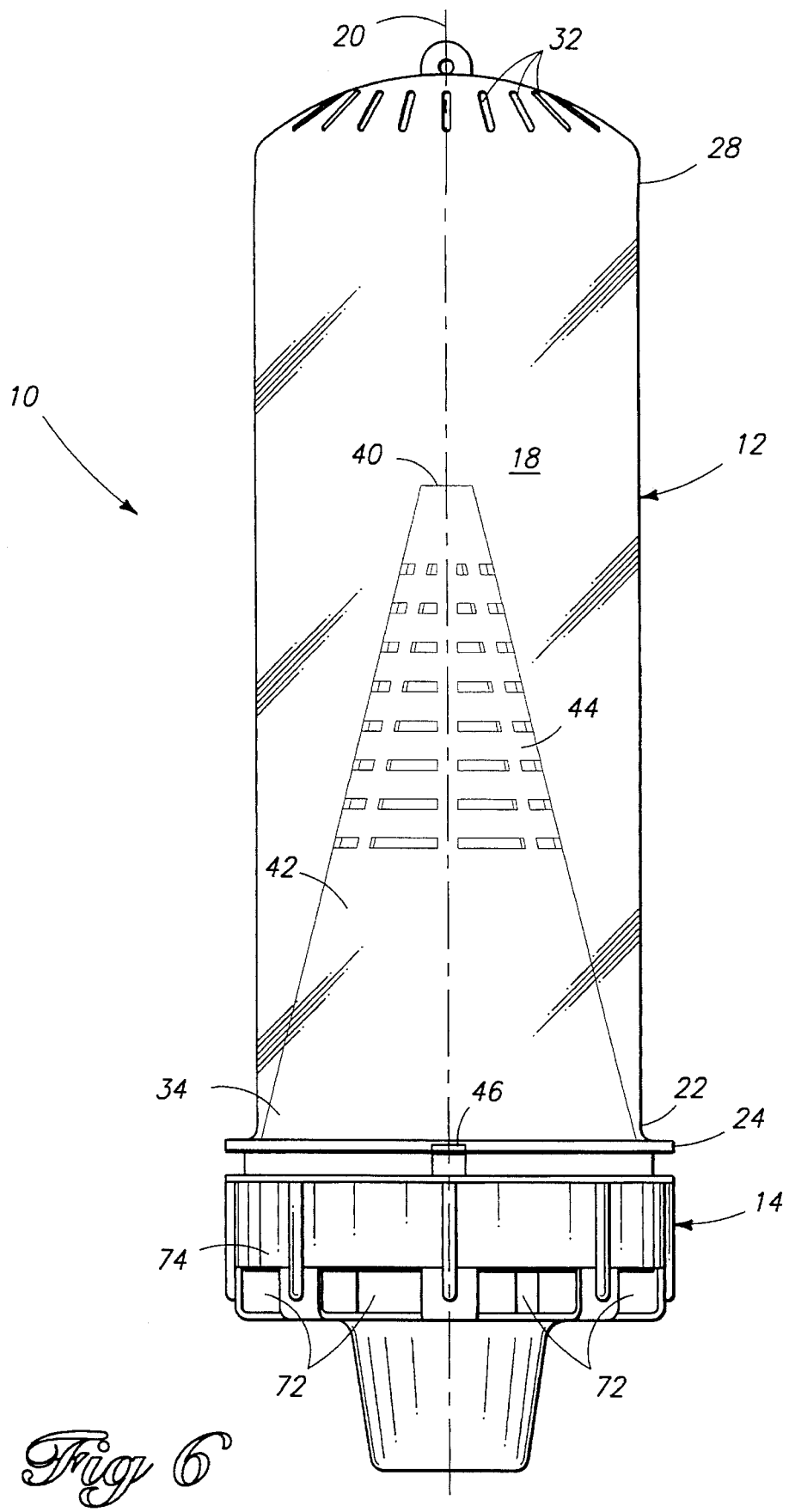
FIG. 6 is a front side view of the yellow jacket trap similar to that of FIG. 1, but showing the trap in an olden or maximum air flow setting.

Due to the threaded coupling, lower member 14 can be adjusted relative to upper member 12 to different positions by partially unscrewing the lower member. These different positions enable various air flow settings. For example, FIG. 1 shows an air flow setting where air circulation is at a minimum. This is because the lower member is fully screwed onto the upper member, causing air flow windows 72 to be mostly occluded by skirt 26 of upper member 12. In contrast, FIG. 6 shows a maximum air flow setting attained by partially twisting the lower member relative to the upper member. Here, air circulation is at a maximum because air flow windows 72 are substantially open and not occluded by skirt 26 of upper member 12. By adjusting the window opening, the user can selectively control air flow circulation through the trap and thus the circulation of the olfactory attractants and food used to entice yellow jackets.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A yellow jacket trap comprising:

a cylindrical upper member defining a hollow entrapment chamber, the upper member having a bottom open end and a top end;

an inverted cone removably inserted within the cylindrical upper member, the inverted cone having a first open end coincident with the bottom open end of the upper member, the inverted cone extending into the entrapment chamber and tapering to a second open end having a diameter less than a diameter of the first open end; and an orientation coupling to align the inverted cone relative to the upper member and to guide the inverted cone during insertion into the upper member and removal therefrom, the orientation coupling having at least one slot formed in the upper member and at least one guide peg projecting from the inverted cone which matingly slides within the slot to orient and guide the inverted cone relative to the upper member.

2. A yellow jacket trap as recited in claim 1, further comprising:

a lower member detachably connected to the upper member to securely fasten the inverted cone within the upper member;

the upper member having at least one vent formed in the top end;

the lower member having at least one air flow window formed therein, the vent and air flow window enabling air circulation through the entrapment chamber; and the lower member being detachably and adjustably connected to the upper member such that the lower member can be adjusted to different positions relative to the upper member to permit different air flow settings, whereby at a first position, the air flow window is open to enable a first air flow setting of maximum circulation, and whereby at a second position, the air flow window is at least partially obscured to enable a second air flow setting of a reduced circulation.

3. A yellow jacket trap comprising:

a cylindrical upper member defining a hollow entrapment chamber, the upper member having a bottom open end and a top end;

an inverted cone removably inserted within the cylindrical upper member, the inverted cone having a first open end coincident with the bottom open end of the upper member, the inverted cone extending into the entrapment chamber and tapering to a second open end having a diameter less than a diameter of the first open end; and at least one pair of prongs projecting from the inverted cone to aid a user when grasping the inverted cone for insertion into or removal from the upper member.

4. A yellow jacket trap comprising:

a cylindrical upper member defining a hollow entrapment chamber, the upper member being aligned along a central longitudinal axis and having a bottom open end and a top end, the upper member having at least one slot formed therein at the bottom open end;

an inverted cone removably inserted within the cylindrical upper member, the inverted cone being coaxially aligned with the upper member along the longitudinal axis and having a first open end coincident with the bottom open end of the upper member, the inverted cone extending into the entrapment chamber and tapering to a second open end having a diameter less than a diameter of the first open end;

the inverted cone having at least one guide peg projecting from the first end of the inverted cone in a radially outward direction relative to the longitudinal axis, the guide peg matingiy sliding within the slot formed in the upper member to orient and guide the inverted cone relative to the upper member;

a detent element formed in the slot to releasably hold the inverted cone within the upper member when the guide peg is moved passed the detent element during insertion of the inverted cone into the upper member; and a lower member detachably connected to the upper member to securely fasten the inverted cone within the upper member.

5. A yellow jacket trap as recited in claim 4 wherein the detent element comprises at least one raised bump formed in the slot.

6. A yellow jacket trap as recited in claim 4 wherein:

the upper member has at least one vent formed in the top end;

the lower member has at least one air flow window formed therein, the vent and air flow window enabling air circulation through the entrapment chamber; and the lower member being detachably and adjustably connected to the upper member such that the lower member can be adjusted to different positions relative to the upper member to permit different air flow settings, whereby at a first position, the air flow window is open to enable a first air flow setting of maximum circulation, and whereby at a second position, the air flow window is at least partially obscured to enable a second air flow setting of a reduced circulation.

7. A yellow jacket trap as recited in claim 6 wherein the upper member has multiple elongated vents formed in the top end, the elongated vents extending radially outward from the longitudinal axis.

8. A yellow jacket trap as recited in claim 4 and further comprising at least one pair of prongs projecting from the inverted cone in a substantially parallel direction with respect to the longitudinal axis to aid a user when grasping the inverted cone for insertion into or removal from the upper member.

9. A yellow jacket trap as recited in claim 8 and further comprising at least one pair of slots formed in the upper member, the prongs being sized to lie within corresponding slots when the inverted cone is inserted into the upper member.

10. A yellow jacket trap comprising:
- a cylindrical upper member defining a hollow entrapment chamber, the upper member having a bottom open end and a top end;
- an inverted cone removably inserted within the cylindrical upper member, the inverted cone having a first open end coincident with the bottom open end of the upper member, the inverted cone extending into the entrapment chamber and tapering to a second open end having a diameter less than a diameter of the first open end;
- an orientation coupling to align the inverted cone relative to the upper member and to guide the inverted cone during insertion into the upper member and removal therefrom; and
- a detent element to releasably hold the inverted cone within the upper member.

11. A yellow jacket trap as recited in claim 10 wherein the orientation coupling comprises a first coupling element formed as part of the upper member and a second coupling element formed as part of the inverted cone, the first and second coupling elements matingly engaging to orient and guide the inverted cone relative to the upper member.

12. A yellow jacket as recited in claim 10 wherein the orientation coupling comprises at least one slot formed in the upper member and at least one guide peg projecting from the inverted cone which matingly slides within the slot to orient and guide the inverted cone relative to the upper member.

13. A yellow jacket trap as recited in claim 10 wherein the detent element comprises at least one raised bump that engages a portion of the inverted cone when the cone is inserted into or removed from the upper member, the raised bump being effective to hold the inverted cone within the upper member while allowing the inverted cone to be inserted and removed when a sufficient urging force is applied.

14. A yellow jacket trap, as recited in claim 10 and further comprising at least one pair of prongs projecting from the inverted cone to aid a user when grasping the inverted cone for insertion from the upper member.

15. A yellow jacket trap as recited in claim 10 and further comprising a lower member detachably connected to the upper member to securely fasten the inverted cone within the upper member.

* * * * *